United States Patent
Bunker

(10) Patent No.: US 10,495,309 B2
(45) Date of Patent: Dec. 3, 2019

(54) SURFACE CONTOURING OF A FLOWPATH WALL OF A GAS TURBINE ENGINE

(71) Applicant: General Electric Company, Schenectady, NY (US)

(72) Inventor: Ronald Scott Bunker, West Chester, OH (US)

(73) Assignee: General Electric Company, Schenectady, NY (US)

(*) Notice: Subject to any disclaimer, the term of this patent is extended or adjusted under 35 U.S.C. 154(b) by 401 days.

(21) Appl. No.: 15/042,586

(22) Filed: Feb. 12, 2016

(65) Prior Publication Data
US 2017/0234537 A1 Aug. 17, 2017

(51) Int. Cl.
F23R 3/00 (2006.01)
F01D 5/18 (2006.01)
(Continued)

(52) U.S. Cl.
CPC ............ F23R 3/002 (2013.01); F01D 5/18 (2013.01); F01D 5/186 (2013.01); F01D 25/12 (2013.01); F02C 3/04 (2013.01); F05D 2230/30 (2013.01); F05D 2240/81 (2013.01); F05D 2260/202 (2013.01); F23R 2900/00018 (2013.01); Y02T 50/671 (2013.01); Y02T 50/673 (2013.01); Y02T 50/676 (2013.01)

(58) Field of Classification Search
CPC .... F23R 3/002; F23R 3/04; F01D 9/00; F01D 25/08; F01D 25/12; F01D 5/046; F01D 5/08; F01D 5/081
See application file for complete search history.

(56) References Cited

U.S. PATENT DOCUMENTS 3,981,142 A * 9/1976 Irwin .................. F23M 5/00
60/753
5,329,773 A * 7/1994 Myers .................. F23R 3/002
60/759
(Continued)

FOREIGN PATENT DOCUMENTS

CN 103032889 A 4/2013
CN 103534531 A 1/2014
(Continued)

OTHER PUBLICATIONS

Extended European Search Report and Opinion issued in connection with corresponding EP Application No. 17155461.1 dated Jul. 12, 2017.
(Continued)

Primary Examiner — Steven M Sutherland
(74) Attorney, Agent, or Firm — Dority & Manning, P.A.

(57) ABSTRACT

A component for at least one of a combustion section or a turbine section of a gas turbine engine is provided. The combustion section and turbine section of the gas turbine engine at least partially define a core air flowpath, and the component includes a wall. The wall, in turn, includes a hot side and an opposite cold side. The hot side is exposed to and at least partially defines the core air flowpath when the component is installed in the gas turbine engine. The wall is manufactured to include surface contouring on the cold side of the wall to structurally accommodate a thermal management feature of the wall.

14 Claims, 6 Drawing Sheets

(51) Int. Cl.
*F01D 25/12* (2006.01)
*F02C 3/04* (2006.01)

(56) References Cited

U.S. PATENT DOCUMENTS

| | | | |
|---|---|---|---|
| 5,419,681 A | 5/1995 | Lee | |
| 5,528,904 A * | 6/1996 | Jones | F01D 5/288 60/753 |
| 6,655,147 B2 * | 12/2003 | Farmer | F23R 3/002 431/350 |
| 6,681,578 B1 * | 1/2004 | Bunker | F23R 3/005 60/759 |
| 8,884,182 B2 | 11/2014 | Lee et al. | |
| 2010/0257864 A1 * | 10/2010 | Prociw | F02C 3/145 60/758 |
| 2013/0205794 A1 | 8/2013 | Xu | |
| 2013/0209233 A1 | 8/2013 | Xu et al. | |
| 2014/0216042 A1 | 8/2014 | Hanson | |
| 2015/0016947 A1 * | 1/2015 | Kwon | F01D 5/186 415/1 |

FOREIGN PATENT DOCUMENTS

| | | |
|---|---|---|
| EP | 2685170 A1 | 1/2014 |
| JP | 2008-248733 A | 10/2008 |
| JP | 2013-083272 A | 5/2013 |
| WO | WO2014/052323 A1 | 4/2014 |

OTHER PUBLICATIONS

First Office Action and Search issued in connection with corresponding CN Application No. 201710075034.0 dated Dec. 3, 2018 (English Translation Unavailable).

* cited by examiner

SURFACE CONTOURING OF A FLOWPATH WALL OF A GAS TURBINE ENGINE

FIELD OF THE INVENTION

The present subject matter relates generally to a surface contouring of certain components within a turbine section and/or a combustion section of a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Within the turbine section, one or more stages of turbine nozzles, including stationary guide vanes, stator vanes, etc., are provided to direct the flow of combustion gasses therethrough. Each stage of turbine nozzles is formed of a plurality of circumferentially spaced turbine nozzle sections, each section including a radially inner and outer endwalls defining in part a flowpath through the turbine section. In order to maintain a temperature of the material forming the endwalls within a desired temperature range, the endwall generally includes one or more thermal management features. For example, the endwall typically includes a plurality of cooling holes extending therethrough.

When the endwalls include a plurality of cooling holes, the endwalls are typically formed thicker than would otherwise be necessary to structurally accommodate the plurality of cooling holes. However, the inventor of the present disclosure has discovered that such may add additional weight to the stage of turbine nozzles and the gas turbine engine in general. Accordingly, a wall for a component capable of structurally accommodating the various thermal management features without adding unnecessary weight would be useful. For example, an endwall for a nozzle section of a stage of turbine nozzles capable of structurally accommodating various thermal management features without adding unnecessary weight would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a component for at least one of a combustion section or a turbine section of a gas turbine engine is provided. The combustion section and turbine section of the gas turbine engine at least partially define a core air flowpath. The component includes a wall including a hot side and an opposite cold side, the hot side exposed to and at least partially defining the core air flowpath. The wall is manufactured to include surface contouring on the cold side of the wall to structurally accommodate a thermal management feature of the wall.

In another exemplary embodiment of the present disclosure, a component for at least one of a combustion section or a turbine section of a gas turbine engine is provided. The combustion section and turbine section of the gas turbine engine at least partially define a core air flowpath. The component includes a wall including a hot side and an opposite cold side. The hot side is exposed to and at least partially defines the core air flowpath, and the cold side defines an uncovered surface. The wall is manufactured to include a base geometry and a local added thickness to the base geometry on the cold side to form a surface contouring on the cold side of the wall.

In one exemplary aspect of the present disclosure, a method is provided for manufacturing a component for at least one of a combustion section or a turbine section of a gas turbine engine. The combustion section and turbine section of the gas turbine engine at least partially define a core air flowpath. The method includes forming a base geometry of a wall of the component. The wall of the component includes a hot side exposed to and at least partially defining the core air flowpath and an opposite cold side. The method also includes modifying the base geometry of the wall of the component to include surface contouring on the cold side of the wall. The method also includes forming one or more thermal management features of the wall, the surface contouring on the cold side of the wall structurally accommodating the one or more thermal management features.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
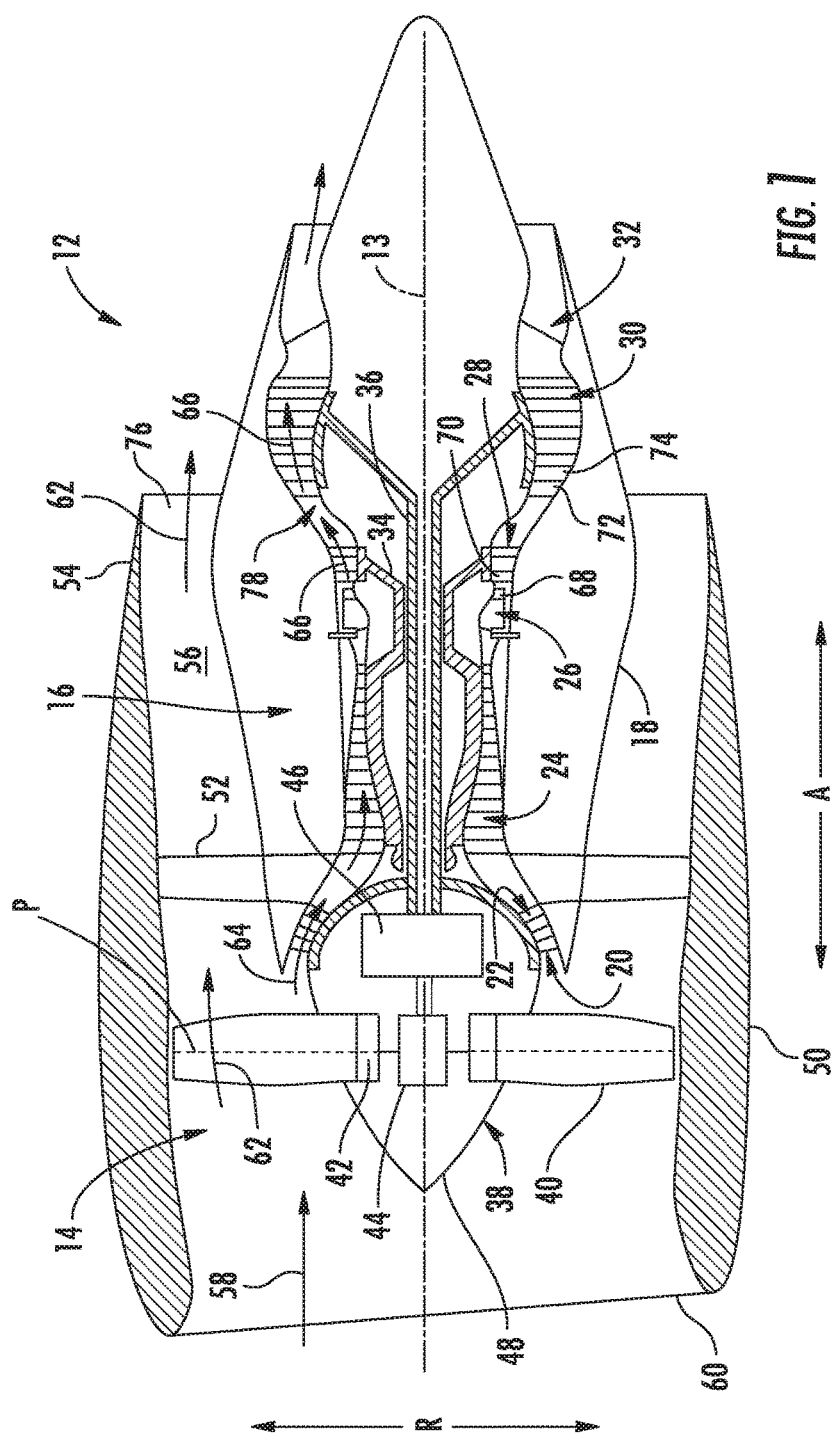
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction C (extending about the longitudinal centerline 13; see FIG. 3) extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
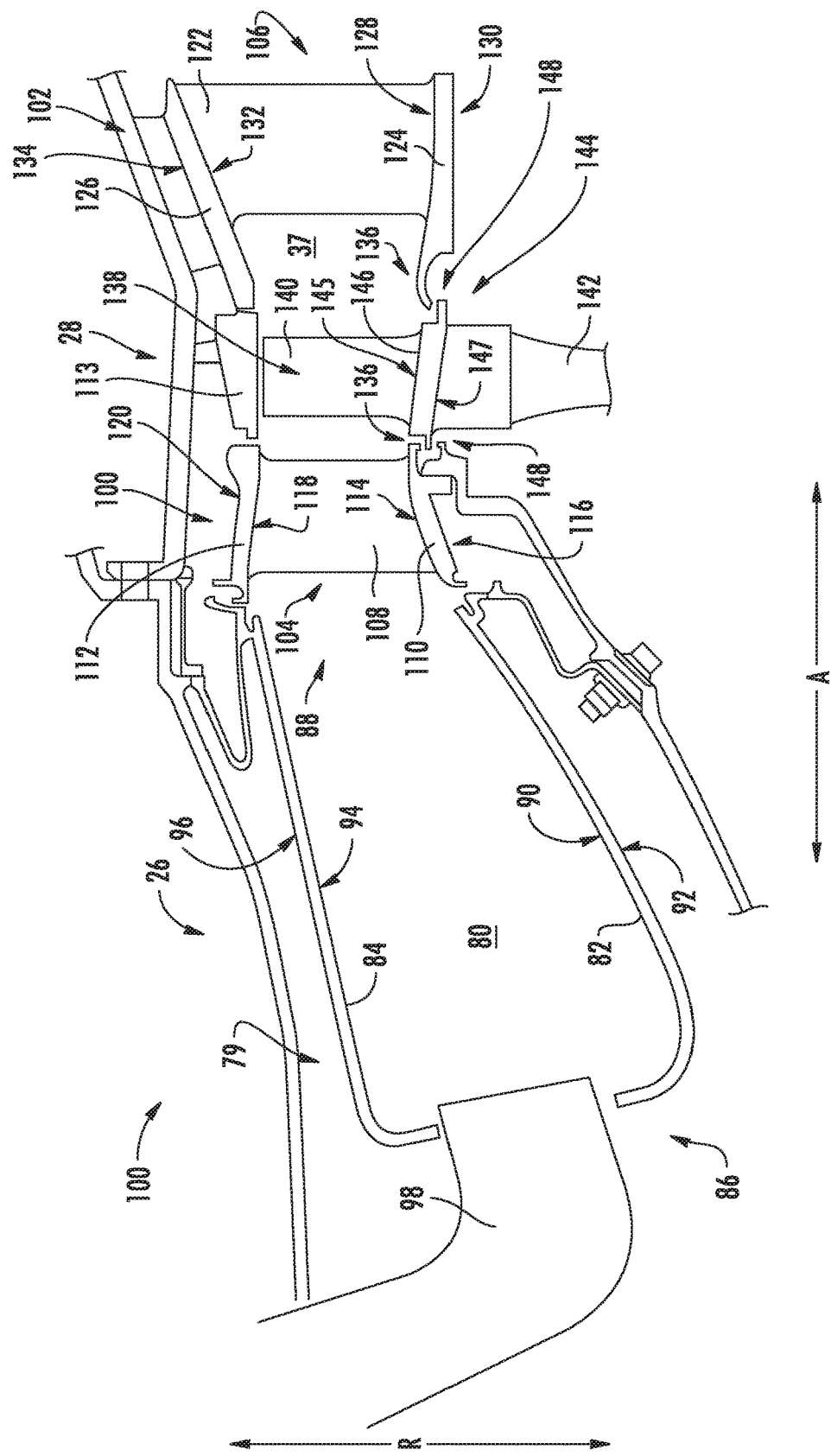
FIG. 2 is a close-up, side view of a combustion section and a turbine section of the exemplary gas turbine engine of FIG. 1.

Referring now to FIG. 2, a close-up, cross-sectional view is provided of the turbofan engine 12 of FIG. 1, and particularly of the combustion section 26 and the HP turbine 28 of the turbine section. The combustion section 26 depicted generally includes a combustor 79 including a combustion chamber 80 defined by an inner liner 82 and an outer liner 84, the combustion chamber 80 extending generally along the axial direction A from a forward end 86 to an aft end 88. The inner liner 82 generally defines a hot side 90 exposed to and defining in part a portion of the core air flowpath 37 extending through the combustion chamber 80, and an opposite cold side 92. Similarly, the outer liner 84 also defines a hot side 94 exposed to and defining in part a portion of the core air flowpath 37 extending through the combustion chamber 80, and an opposite cold side 96. Although not depicted, the inner and/or outer liners 82, 84 may include one or more cooling holes extending therethrough, or other thermal management features, to maintain a temperature of the inner and/or outer liners 82, 84 within a desired operating temperature range.

Moreover, a plurality of fuel nozzles 98 are positioned at the forward end 86 of the combustion chamber 80 for providing the combustion chamber 80 with a mixture of fuel and compressed air from the compressor section. As discussed above, the fuel and air mixture is combusted within the combustion chamber 80 to generate a flow of combustion gasses therethrough. For the embodiment depicted, the combustor 79 is configured as an annular combustor.

Downstream of the combustion section 26, the HP turbine 28 includes a plurality of turbine component stages, each turbine component stage comprising a plurality of turbine components. More particularly, for the embodiment depicted, the HP turbine 28 includes a plurality of turbine nozzle stages, as well as one or more stages of turbine rotor blades. Specifically, for the embodiment depicted, the HP turbine 28 includes a first turbine nozzle stage 100 and a second turbine nozzle stage 102, each configured to direct a flow of combustion gasses therethrough. The first turbine nozzle stage 100 includes a plurality of turbine nozzle sections 104 spaced along the circumferential direction C. Notably, the first turbine nozzle stage 100 is located immediately downstream from the combustion section 26, and thus may also be referred to as a combustor discharge nozzle stage having a plurality of combustion discharge nozzle sections. Additionally, for the exemplary embodiment depicted, the second turbine nozzle stage 102 also includes a plurality of turbine nozzle sections 106 spaced along the circumferential direction C.

The first turbine nozzle sections 104 forming the first turbine nozzle stage 100 includes a first stage turbine nozzle 108 positioned within the core air flowpath 37, as well as a wall. More particularly, the nozzle section 104 includes an inner endwall 110 and an outer endwall 112, with the nozzle 100 extending generally along the radial direction R from the inner endwall 110 to the outer endwall 112. The inner endwall 110 of the first nozzle section 104 defines a hot side 114 exposed to and at least partially defining the core air flowpath 37 and an opposite cold side 116. Similarly, the outer endwall 112 of the first nozzle section 104 defines a hot side 118 exposed to and at least partially defining the core air flowpath 37 and an opposite cold side 120. Notably, for the embodiment depicted, the cold sides 116, 120 of the inner and outer endwalls 110, 112 are uncovered and accessible prior to assembly (i.e., not enclosed within a component).

Similar to the first turbine nozzle stage 100, the second turbine nozzle sections 106 forming the second turbine nozzle stage 102 each include a second stage turbine nozzle 122 positioned within the core air flowpath 37, as well as a wall. More particularly, the nozzle section 106 includes an inner endwall 124 and an outer endwall 126, with the second stage turbine nozzle 122 extending generally along the radial direction R from the inner endwall 124 to the outer endwall 126. The inner endwall 124 of the second nozzle section 106 defines a hot side 128 exposed to and at least partially defining the core air flowpath 37 and an opposite cold side 130. Similarly, the outer endwall 126 of the second nozzle section 106 defines a hot side 132 exposed to and at least partially defining the core air flowpath 37 and an opposite cold side 134. As with the inner and outer endwalls 110, 112 of the first turbine nozzle sections 104, for the embodiment depicted, the cold sides 130, 134 of the inner and outer endwalls 124, 126 of the second turbine nozzle sections 106 are uncovered and accessible (i.e., not enclosed within a component).

Moreover, as is also depicted in FIG. 2, each of the turbine nozzle sections 104, 106 of the first turbine nozzle stage 100 and the second turbine nozzle stage 102, respectively, include seals 136, the seals 136 also at least partially exposed to the core air flowpath 37, as will be discussed in greater detail below.

Located immediately downstream of the first turbine nozzle stage 100 and immediately upstream of the second turbine nozzle stage 102, the HP turbine 28 includes a first stage 138 of turbine rotor blades 140. The first stage 138 of turbine rotor blades 140 includes a plurality of turbine rotor blades 140 spaced along the circumferential direction C (see FIG. 3) and a first stage rotor 142. The plurality of turbine rotor blades 140 each include a base 144 through which the respective turbine rotor blade 110 is attached to the first stage rotor 142. Although not depicted, the turbine rotor 142 is, in turn, connected to the HP shaft 34 (see FIG. 1). In such manner, the turbine rotor blades 140 may extract kinetic energy from the flow of combustion gasses through the core air flowpath 37 defined by the HP turbine 28 as rotational energy applied to the HP shaft 34. The turbofan engine 12 additionally includes a shroud 113 exposed to and at least partially defining the core air flowpath 37. The shroud 113 is configured to form a seal with the first stage 138 of turbine rotor blades 140.

Similar to the plurality of nozzles sections 104, 106 forming the first and second turbine nozzle stages 100, 102, the base 144 of each of the turbine rotor blades 140 includes a wall, or platform 146. The platform 146 of the base 114 of each of the turbine rotor blades 140 also defines a hot side 145 exposed to and at least in part defining the core air flowpath 37, as well as an opposite cold side 147. Further, the platform 146 of each of the turbine rotor blades 140 includes a seal 148. The seals 148 are configured to interact with the seals 136 of the turbine nozzle sections 104, 106 forming the first and second turbine nozzle stages 100, 102 to prevent an undesired flow of combustion gasses from the core air flowpath 37 between the first stage 138 of turbine rotor blades 140 and the first and second turbine nozzle stages 100, 102. Additionally, as will be appreciated, a tip 120 of each respective rotor blade 140 is configured to form a seal with the shroud 113.

Figure 3:
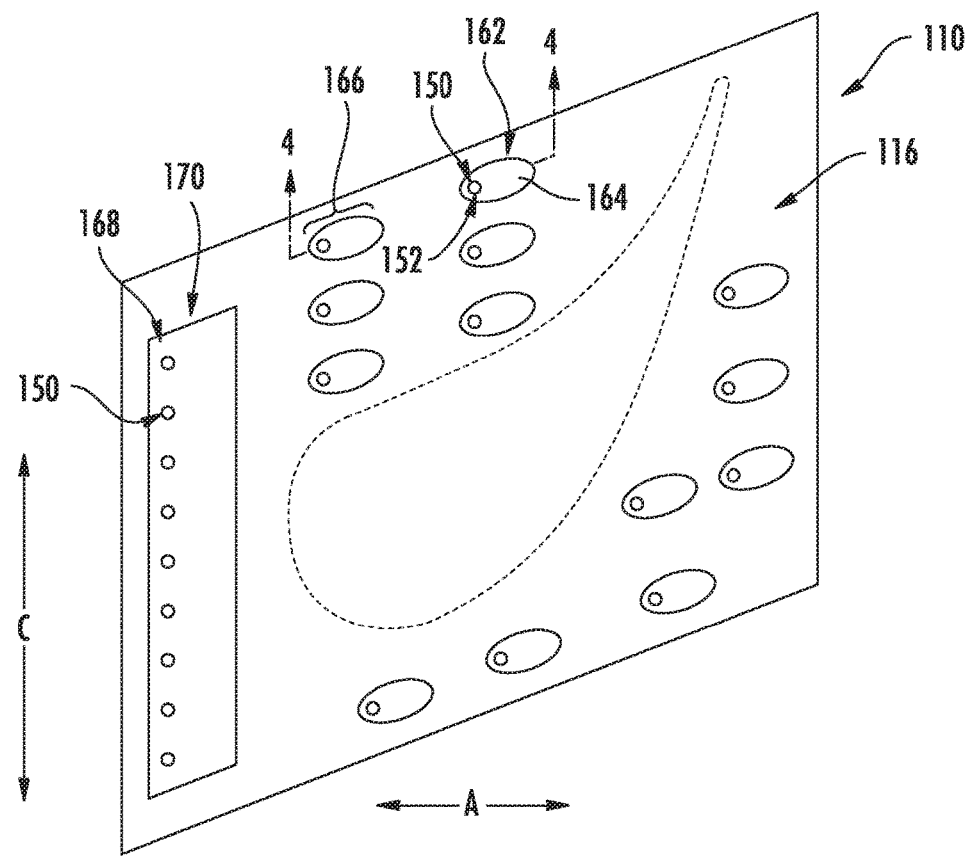
FIG. 3 is plane view of a cold side of a wall of a component in accordance with an exemplary embodiment of the present disclosure.
Figure 4:
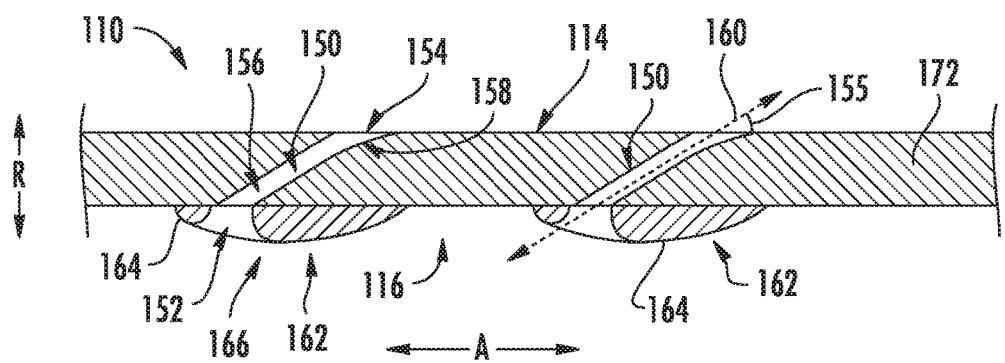
FIG. 4 is a side, cross-sectional view of the wall of the exemplary component of FIG. 3, taken along Line 4-4 in FIG. 3.

Referring now to FIGS. 3 and 4, views are provided of a wall in accordance with an exemplary embodiment of the present disclosure for a component of at least one of a combustion section or a turbine section of a gas turbine engine. More particularly, FIG. 3 provides a plane view of a cold side of the exemplary wall; and FIG. 4 provides a side, cross-sectional view of a portion of the exemplary wall of FIG. 3, taken along Line 4-4 in FIG. 3.

For the exemplary embodiment depicted, the wall is configured as an endwall of a nozzle section of a turbine nozzle stage for a turbine section of the gas turbine engine. More particularly, for the embodiment depicted the wall is configured as an inner endwall 110 of a nozzle section 104 of a first turbine nozzle stage 100. The inner endwall 110 may be configured in substantially the same manner as the exemplary inner endwall 110 described above with reference to FIG. 2, and thus the same or similar numbers may refer to the same or similar parts.

Accordingly, the endwall 110 depicted (also referred to herein simply as a wall 110) generally defines a hot side 114 exposed and at least partially defining the core air flowpath 37 and an opposite cold side 116. Additionally, the wall 110 may be attached to or formed integrally with a first stage turbine nozzle 108 on the hot side 114 (depicted in phantom; see also FIG. 2). Although not depicted, one or more cooling airflow passages may extend through the endwall 110 depicted to provide an inner cavity of the first stage of turbine nozzle 108 with a flow of cooling air during operation. It should be appreciated, that the axial, radial, and circumferential directions A, R, C identified in FIGS. 3 and 4 correspond to the axial, radial, and circumferential directions A, R, C defined by the exemplary turbofan engine 12 described above. Accordingly, the directions identified in FIGS. 3 and 4 may be the directions in which the exemplary wall 110 depicted extends when installed in the exemplary turbofan engine 12.

As discussed above, during operation of the gas turbine engine, the hot side 114 of the wall 110 is exposed to relatively hot combustion gases flowing thereover. In order to accommodate such a flow of hot combustion gases, the wall 110 of the nozzle section 104 includes a thermal management feature. For the embodiment depicted, the thermal management feature is a cooling hole 150 defined by the wall 110. Specifically, for the embodiment depicted, the thermal management feature of the wall 110 is a plurality of cooling holes 150 defined by the wall 110. Each of the plurality of cooling holes 150 extends from an inlet 152 on the cold side 116 of the wall 110 to an outlet 154 on the hot side 114 of the wall 110.

Also for the embodiment depicted, each of the plurality of cooling holes 150 defines an angle 155 less than ninety degrees (90°) relative to the wall 110. More particularly, the plurality of cooling holes 150 depicted each include a body section 156 and a flared outlet section 158. The angle 135 defined by the plurality of cooling holes 150 is an angle between a centerline 160 of the body section 156 of the cooling holes 150 and a surface of the wall 110, such as surface of the wall 110 on the hot side 114. Notably, the flared outlet section 158 is an area where additional amount of material of the wall 110 has been removed to encourage a flow of cooling air through the cooling holes 150 to form a cooling film on the hot side 114 of the wall 110. It should be appreciated, however, that in other embodiments, one or more of the cooling holes 150 may have any other suitable shape, orientation, or configuration.

In order to structurally accommodate the material removed from the wall 110 for the cooling holes 150 and particularly for the flared outlet sections 158 of the cooling holes 150, prior walls (e.g., endwalls) have been manufactured with sufficient thickness to remain structurally sound despite a removal of such material. However, the inventor of the present disclosure has found that such may lead to the inclusion of unnecessary material, potentially increasing a cost and weight of the various component sections including these walls.

Accordingly, the wall 110 depicted in FIGS. 3 and 4 is manufactured to include surface contouring 162 on the cold side 116 of the wall 110 to structurally accommodate the thermal management feature of the wall 110. More particularly, for the embodiment depicted, wherein the thermal management feature of the wall 110 includes the cooling hole 150, or rather the plurality of cooling holes 150, the surface contouring 162 on the cold side 116 of the wall 110 includes additional material 164 added to a local region 166 surrounding the inlet 152 of the cooling hole 150 (i.e., a local added thickness). More particularly, for the embodiment depicted, the surface contouring 162 on the cold side 116 of the wall 110 includes additional material 164 added to a plurality of local regions 166, each local region 166 surrounding the inlet 152 of one or more of the plurality of cooling holes 150. Furthermore, given the angle 155 at which the cooling hole 150 extends relative to the wall 110, the additional material 164 added to the local region 166 surrounding the inlet 152 of each of the cooling holes 150 extends to a region on the cold side 116 of the wall 110 opposite the outlet 154 of the cooling hole 150. Such a configuration may allow for the cooling holes 150 to include relatively large flared outlet sections 158.

Notably, for the exemplary cooling holes 150 depicted in FIG. 3, at least some of the surface contouring 162 includes additional material 164 added to various local regions 166, each local region 166 surrounding a single, individual cooling hole 150. However, in other locations, the surface contouring 162 may cover a plurality of thermal management features. For example, the exemplary wall 110 depicted includes a row 168 of cooling holes 150 at a forward end of the wall 110. With such an embodiment, the surface contouring 162 accommodates each of the plurality of thermal management features, or rather for the embodiment depicted, the row 168 of cooling holes 150. More particularly, as is depicted the row 168 of cooling holes 150 at the forward end of the wall 110 includes a corresponding row 170 of surface contouring 162, the surface contouring 162 including additional material 164 added to a local region 166 surrounding the inlets 152 of each of the plurality of cooling holes 150 in the row 168 of cooling holes 150. Further, the surface contouring 162 includes additional material 164 added a region on the cold side 116 of the wall 110 opposite the outlets 154 of each of the plurality of cooling holes 150 in the row 168 of cooling holes 150.

As is discussed in greater detail below reference to the exemplary flowchart depicted in FIG. 9, the wall 110 depicted generally includes a base geometry 172 and the surface contouring 162 is formed of the additional material 164 added to the base geometry 172 (i.e., a local added thickness to the base geometry 172 on the cold side 116). For example, in certain exemplary aspects, the base geometry 172 of the wall 110 may be formed by casting, and the surface contouring 162 may be added to the base geometry 172 using an additive manufacturing process (also known as rapid prototyping, rapid manufacturing, and 3D printing). For example, in certain exemplary aspects, the base geometry 172 of the wall 110 may formed by casting, and the surface contouring 162 (including the additional material 164) on the cold side 116 of the wall 110 may be added to the base geometry 172 using selective laser sintering (SLS), direct metal laser sintering (DMLS), electron beam melting (EBM), diffusion bonding, or selective heat sintering (SHS). Accordingly, when the surface contouring 162 includes additional material 164 added to the base geometry 172 around a cooling hole 150, the additional material 164 may be added in such a manner that leaves the cooling hole 150 open and extended. Such may be accomplished by adding the additional material 164 using an additive manufacturing process. Additionally, or alternatively, the additional material 164 may be added to the base geometry 172 before the cooling holes 150 are machined, and machining the cooling holes 150 may include machining through the additional material 164.

Figure 5:
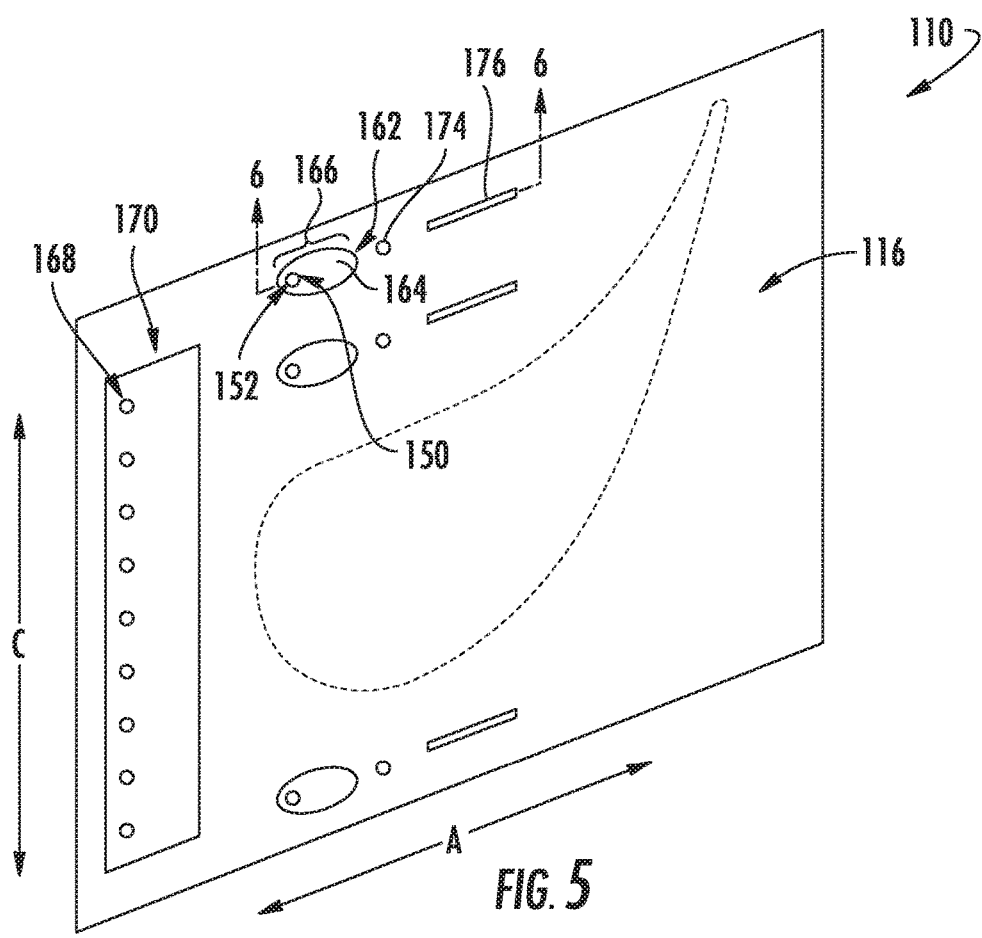
FIG. 5 is a plane view of a cold side of a wall of a component in accordance with another exemplary embodiment of the present disclosure.
Figure 6:
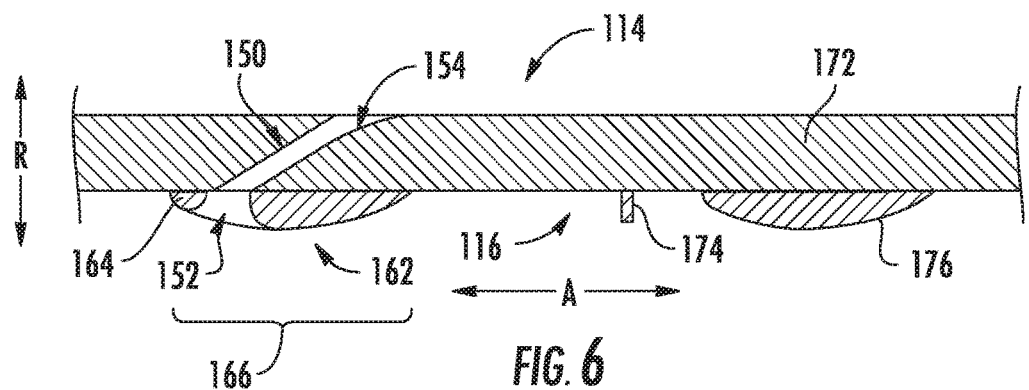
FIG. 6 is a side, cross-sectional view of the wall of the exemplary component of FIG. 5, taken along Line 6-6 in FIG. 5.

Referring now to FIGS. 5 and 6, views are provided of a wall 110 for a component of at least one of a combustion section or a turbine section of a gas turbine engine in accordance with another exemplary embodiment of the present disclosure. More particularly, FIG. 5 provides a plane view of a cold side 116 of the exemplary wall 110; and FIG. 6 provides a side, cross-sectional view of a portion of the exemplary wall 110 of FIG. 5, taken along Line 6-6 in FIG. 5.

The exemplary wall 110 depicted is configured in substantially the same manner as exemplary wall 110 described above with reference to FIGS. 3 and 4, and thus the same or similar numbers may refer to the same or similar parts. Accordingly, the wall 110 (or endwall 110) depicted generally includes a hot side 114 exposed the core air flowpath 37 and an opposite cold side 116. Additionally, as is depicted in phantom in FIG. 3, the wall 110 may be attached to or formed integrally with a first stage turbine nozzle 108 on the hot side 114 (see also FIG. 2).

Further, the exemplary wall 110 includes a thermal management feature configured as a cooling hole 150, or rather configured as a plurality of cooling holes 150. Each cooling hole 150 extends from an inlet 152 on the cold side 116 of the wall 110 to an outlet 154 on the hot side 114 of the wall 110. However, for the embodiment depicted, the exemplary wall 110, or rather the cold side 116 of the exemplary wall 110 includes additional thermal management features. Specifically, the cold side 116 of the wall 110 depicted includes thermal management features configured as a plurality of turbulators 174 for disrupting an airflow over the cold side 116 of the wall 110 (i.e., creating turbulence) and increasing heat transfer with such airflow. For the embodiment depicted, the turbulators 174 are configured as a plurality of cylindrical pins extending perpendicular to the cold side 116 of the wall 110. However, in other embodiments, the turbulators 174 may have any other suitable configuration, such as any other suitable size or shape. Further, for the embodiment depicted, the cold side 116 of the exemplary wall 110 includes additional thermal management features configured as fins 176 for increasing a heat exchange with an airflow passing over the cold side 116 of the wall 110. Notably, for the embodiment depicted, no additional surface contouring 162 is required to be added to the turbulators 174 and/or fins 176 on the cold side 116 of the wall 110 to structurally accommodate such thermal management features.

Figure 7:
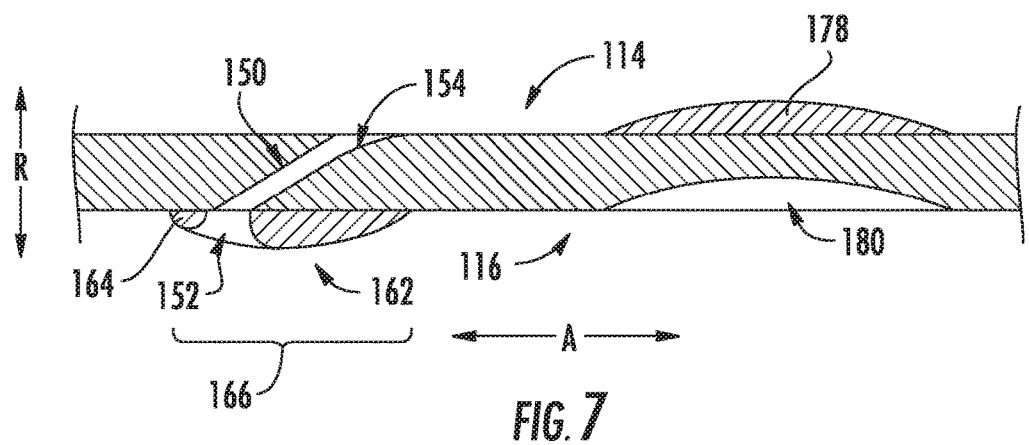
FIG. 7 is a side, cross-sectional view of a wall of a component in accordance with yet another exemplary embodiment of the present disclosure.

Moreover, referring now to FIG. 7, a side, cross-sectional view is provided of a portion of a wall 110 for a component of at least one of a combustion section or a turbine section of a gas turbine engine in accordance with yet another exemplary embodiment of the present disclosure. The view of the wall 110 in FIG. 7 may be taken from the same perspective of the view of the exemplary wall 110 of FIG. 4, and further the exemplary wall 110 of FIG. 7 may be configured in substantially the same manner as exemplary wall 110 described above with reference to FIGS. 3 and 4. Thus the same or similar numbering may refer to the same or similar parts. The exemplary wall 110 (or endwall 110) of FIG. 7 accordingly generally defines a hot side 114 exposed the core air flowpath 37 and an opposite cold side 116. Additionally, the exemplary wall 110 depicted includes a plurality of thermal management features. The thermal management features include at least one cooling hole 150 extending from an inlet 152 on the cold side 116 of the wall 110 to an outlet 154 on the hot side 114 of the wall 110. The wall 110 additionally includes surface contouring 162 on the cold side 116 of the wall 110 structurally accommodating the at least one cooling hole 150.

Furthermore, for the embodiment depicted, the thermal management features of the exemplary wall 110 depicted additionally include a local contour on the hot side 114 of the wall 110. Specifically, for the embodiment depicted, the thermal management features of the exemplary wall 110 depicted additionally include a ridge 178 on the hot side 114 of the wall 110. The ridge 178 on the hot side 114 of the wall 110 may be configured to, e.g., manipulate a flow of hot combustion gases in a desired manner to achieve a desired thermal effect. Additionally, for the embodiment depicted, the contouring 162 on the cold side 116 of the wall 110 structurally accommodating such thermal feature (i.e., the local contour configured as the ridge 178 on the hot side 114 of the wall 110) includes a local contour complementary to such thermal feature. Specifically, for the embodiment depicted, the contouring 162 on the cold side 116 of the wall 110 structurally accommodating such thermal feature includes a valley region 180 corresponding substantially in shape to the ridge 178 on the hot side 114 of the wall 110. Such a configuration may allow for the wall 110 to maintain a substantially continuous thickness (e.g., along the radial direction R) despite inclusion of the ridge 178 for manipulating the flow of hot combustion gases over the hot side 114 of the wall 110. More particularly, such a configuration may allow for a substantially consistent thermal stress along a length of the wall 110 (e.g., along the axial direction A), despite the inclusion of the ridge 178.

With such an exemplary embodiment, the surface contouring 162 may be added to the wall 110 by removing material from a base geometry 172 of the wall 110. For example, the base geometry 172 of the wall 110 may be cast, and the surface contouring 162 may be removed from the base geometry 172, e.g., by machining or drilling material from the base geometry 172. Notably, the thermal management feature, or more particularly, the ridge 178 on the hot side 114 of the wall 110, may be added to the base geometry 172, e.g., using an additive manufacturing process.

Figure 8:
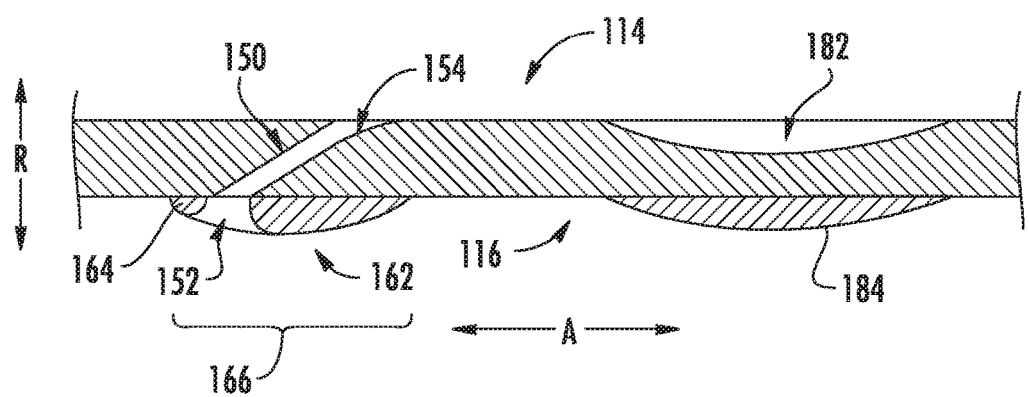
FIG. 8 is a side, cross-sectional view of a wall of a component in accordance with still another exemplary embodiment of the present disclosure.

It should be appreciated, however, that in other embodiments, the thermal management feature of the wall 110 may additionally, or alternatively include various other forms of local contouring. For example, the thermal management feature of the wall 110 may additionally, or alternatively, include a valley or other indentation on the hot side 114 of the wall 110. For example, referring now briefly to FIG. 8, a side, cross-sectional view is provided of a portion of a wall 110 in accordance with still another exemplary embodiment of the present disclosure. The wall 110 depicted in FIG. 8 may be configured in substantially the same manner as the exemplary wall 110 depicted in FIG. 7. However, for the embodiment of FIG. 8, the wall 110 includes a thermal management feature configured as a valley region 182 on the hot side 114 of the wall 110. The valley region 182 on the hot side 114 of the wall 110 may be configured to manipulate a flow of hot combustion gases over the wall 110 to achieve a desired thermal effect. With such an exemplary embodiment, the surface contouring 162 on the cold side 116 of the wall 110 configured to structurally accommodate the thermal management feature includes additional material 164 added to the wall 110 in a local region 166 opposite the valley region 182 on the hot side 114 of the wall 110. More specifically, the surface contouring 162 on the cold side 116 of the wall 110 includes a ridge 184 added to the wall 110 having substantially the same shape as the valley region 182 on the hot side 114 of the wall 110. Such a configuration may allow for the wall 110 to maintain a substantially continuous thickness (e.g., along the radial direction R) despite inclusion of the valley region 182 for manipulating the flow of hot combustion gases over the hot side 114 of the wall 110. More particularly, such a configuration may allow for a substantially consistent thermal stress along a length of the wall 110 (e.g., along the axial direction A), despite the inclusion of the valley region 182.

With such an exemplary embodiment, the surface contouring 162 may be added to the wall 110 using an additive manufacturing process. For example, a base geometry 172 of the wall 110 may be cast, the valley region 182 may be removed from the base geometry 172, e.g., by machining or drilling material from the base geometry 172, and the surface contouring 162, or more particularly, the ridge 178 on the cold side 116 of the wall 110, may be added to the base geometry 172, e.g., using an additive manufacturing process.

A wall of a component in accordance with one or more embodiments of the present disclosure may result in a more structurally sound wall, while still allowing for a desired number and form of thermal management features. For example, a wall of a component in accordance with one or more embodiments of the present disclosure may not require forming an entirety of the wall thicker than necessary to accommodate the desired number and form of thermal management features. Accordingly, a wall in accordance with one or more embodiments of the present disclosure may result in a lighter, less expensive, and more structurally sound wall for a component of at least one of a combustion section or a turbine section of a gas turbine engine.

It should be appreciated, however, that although the exemplary walls described above with reference to FIGS. 3 through 8 are described as being an inner endwall 110 of a nozzle section 104 of a first turbine nozzle stage 100, in other exemplary embodiments, the walls described above with reference to FIGS. 3 through 7 may instead be part of any other suitable component of a combustion section 26 or a turbine section of the turbofan engine 12. For example, in other exemplary embodiments, the wall 110 may be a wall of a combustor 79, or more particularly, the wall may be at least one of the inner liner 82 of the combustor 79 or the outer liner 84 of the combustor 79. Additionally, or alternatively, the wall may be a wall 110 of a nozzle section 104 of the second turbine nozzle stage 102, such as the inner endwall 124 or outer endwall 126 of one of the nozzle sections 106 of the second turbine nozzle stage 102. Further in still other exemplary embodiments, the wall may be a wall, or platform 146, of a turbine blade 140 of the first stage 138 of turbine blades 140, or any other stage of turbine blades. Furthermore, in still other exemplary embodiments, the wall may be a wall of a shroud (such as the exemplary shroud 113 of FIG. 2).

Furthermore, it should be appreciated that although the above components are described in the context of the exemplary turbofan engine 12 depicted in FIG. 1, in other exemplary embodiments, aspects of the present disclosure may be incorporated into a turbofan engine 12 having any other suitable configuration. Additionally, or alternatively, in still other embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other exemplary embodiments, aspects of the present disclosure may be incorporated into any other suitable turbomachine, including, without limitation, a steam turbine, a centrifugal compressor, and/or a turbocharger.

Figure 9:
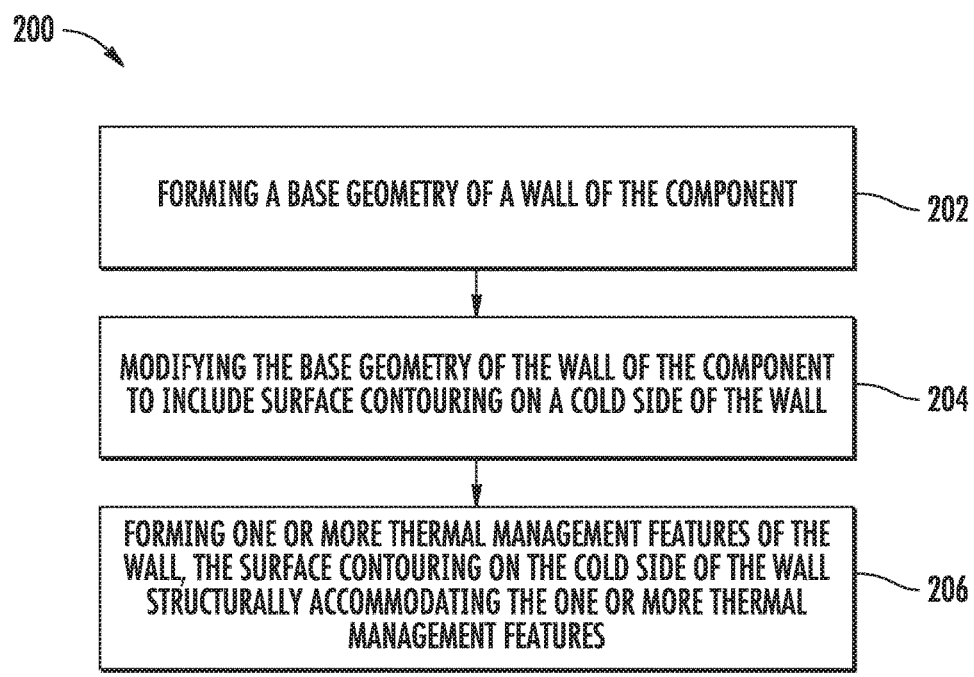
FIG. 9 is a flow diagram of a method for manufacturing a component for a gas turbine engine in accordance with an exemplary embodiment of the present disclosure.

Referring now to FIG. 9, a flow chart is provided of a method (200) in accordance with an exemplary aspect of the present disclosure for manufacturing a component for at least one of a combustion section or a turbine section of a gas turbine engine. In certain exemplary aspects, the combustion section and turbine section of the gas turbine engine may be configured in substantially the same manner as the combustion section and turbine section of the exemplary turbofan engine described above with reference to FIGS. 1 and 2. Accordingly, the combustion section and turbine section of the gas turbine engine may at least partially define a core air flowpath.

The exemplary method (200) includes at (202) forming a base geometry of a wall of the component. The wall of the component defines a hot side exposed to the core air flowpath and an opposite cold side. Additionally, for the exemplary aspect depicted, forming the base geometry of the wall of the component at (202) includes at (203) casting the base geometry of the wall of the component. Casting a base geometry of the wall of the component at (203) may be carried out using any suitable casting technique.

The exemplary method (200) additionally includes at (204) modifying the base geometry of the wall of the component to include surface contouring on the cold side of the wall, and at (206) forming one or more thermal management features of the wall. The surface contouring on the cold side of the wall formed by modifying the base geometry the wall at (204) structurally accommodates the one or more thermal management features formed at (206).

In certain exemplary aspects, the one or more thermal management features of the wall formed at (206) include one or more cooling holes extending from the cold side of the wall to the hot side of the wall. With such an exemplary aspect, modifying the base geometry of the wall of the component to include surface contouring on the cold side of the wall at (204) includes adding material to form the surface contouring on the cold side of the wall. In certain exemplary aspects, the material may be added to the cold side of the wall to form the surface contouring using an additive manufacturing process. Further, in such an exemplary aspect, forming the one or more thermal management features of the wall at (206), i.e., forming the one or more cooling holes, may include drilling the one or more cooling holes from the cold side of the wall to the hot side of the wall and through the surface contouring on the cold side of the wall.

Notably, in certain exemplary aspects, drilling the one or more cooling holes may include drilling the one or more cooling holes at an angle less than ninety degrees (90°) relative to the wall, such that the one or more cooling holes defined a slant relative to the wall. With such an exemplary aspect, adding material to form the surface contouring on the cold side of the wall may further include adding material to the cold side of the wall opposite a location, or an anticipated location, of an outlet of the cooling hole on the hot side of the wall.

In other exemplary aspects, however, modifying the base geometry the wall of the component to include surface contouring on the cold side of the wall at (204) may include removing material from the base geometry of the wall of the component. With such an exemplary aspect, forming one or more thermal management features of the wall at (206) may include adding material to the hot side wall opposite where the base geometry of the wall is modified to include the service contouring on the cold side. For example, the material added to the hot side may form a ridge and the material removed from the cold side wall to form the service contouring may form a valley having substantially the same shape as the ridge.

It should be appreciated, however, that the exemplary method (200) of manufacturing a component for at least one of a combustion section or a turbine section of a gas turbine engine is provided by way of example only. For example, in other exemplary aspects, the base geometry of the component may not be formed by casting, and instead may be formed using an additive manufacturing process. With such an exemplary aspect, the entirety of the component, including the surface contouring on the cold side of the component, may be formed using an additive manufacturing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for at least one of a combustion section or a turbine section of a gas turbine engine, the combustion section and turbine section of the gas turbine engine at least partially defining a core air flowpath, the component comprising:
    a wall comprising a hot side and a cold side positioned opposite the hot side, the hot side exposed to and at least partially defining the core air flowpath, the wall manufactured to include surface contouring on the cold side of the wall;
    wherein a thermal management feature of the wall is a cooling hole defined by the wall and extending from an inlet on the cold side of the wall to an outlet on the hot side of the wall, and wherein the surface contouring on the cold side of the wall comprises additional material added to a local region surrounding the inlet of the cooling hole, the additional material surrounding the inlet of the cooling hole and extending continuously to a region on the cold side of the wall opposite the outlet of the cooling hole, wherein the additional material extends less than continuously in a circumferential direction of the gas turbine engine;
    wherein the cooling hole defines an angle less than ninety degrees relative to the wall.

2. The component of claim 1, wherein the thermal management feature of the wall further comprises a plurality of cooling holes defined by the wall and spaced along the circumferential direction, each cooling hole extending from an inlet on the cold side of the wall to an outlet on the hot side of the wall, and wherein the surface contouring on the cold side of the wall comprises additional material added to local regions surrounding the inlets of each of the cooling holes, the local regions spaced along the circumferential direction.

3. The component of claim 1, wherein the component is a nozzle section of a turbine nozzle stage for the turbine section of the gas turbine engine.

4. The component of claim 3, wherein the wall is an endwall of the nozzle section.

5. The component of claim 1, wherein the component is a combustor, and wherein the wall is a liner of the combustor.

6. The component of claim 1, wherein the cold side is uncovered and unenclosed, wherein the thermal management feature of the wall is a first thermal management feature and the surface contouring of the wall is a first surface contouring, wherein the wall of the component further comprises a second thermal management feature configured as a local contour on the hot side of the wall and a second surface contouring, and wherein the second surface contouring on the cold side of the wall comprises a local contour corresponding in shape to the local contour on the hot side of the wall.

7. The component of claim 1, wherein the wall comprises a base geometry, and wherein the surface contouring is added to the base geometry using an additive manufacturing process.

8. The component of claim 7, wherein the base geometry of the wall is formed by casting.

9. The component of claim 1, wherein the thermal management feature of the wall is a first thermal management feature and the surface contouring of the wall is a first surface contouring, wherein the wall of the component further comprises a second thermal management feature configured as a ridge on the hot side of the wall and a second surface contouring, and wherein the second surface contouring on the cold side of the wall comprises a valley region corresponding substantially in shape to the ridge on the hot side of the wall.

10. The component of claim 9, wherein the wall maintains a substantially constant thickness along a radial direction despite the inclusion of the ridge on the hot side and the valley region on the cold side.

11. The component of claim 1, wherein the thermal management feature of the wall further comprises a plurality of cooling holes defined by the wall and spaced along the circumferential direction, each cooling hole extending from an inlet on the cold side of the wall to an outlet on the hot side of the wall, and wherein the surface contouring on the cold side of the wall comprises additional material added to local regions surrounding the inlets of each of the cooling holes, the additional material extending continuously in the circumferential direction of the gas turbine engine across the local regions and less than continuously in the circumferential direction.

12. A component for at least one of a combustion section or a turbine section of a gas turbine engine, the combustion section and turbine section of the gas turbine engine at least partially defining a core air flowpath, the component comprising:
    a wall comprising a hot side and a cold side positioned opposite the hot side, the hot side exposed to and at least partially defining the core air flowpath and the cold side being uncovered and unenclosed, the wall manufactured to include a base geometry and a local added thickness to the base geometry on the cold side to form a surface contouring on the cold side of the wall;
    wherein a thermal management feature of the wall is a local contour on the hot side of the wall, and wherein the surface contouring on the cold side of the wall comprises a local contour corresponding in shape to the local contour on the hot side of the wall;
    wherein the thermal management feature of the wall is a first thermal management feature and the surface contouring of the wall is a first surface contouring, wherein the wall of the component further comprises a second thermal management feature and a second surface contouring, wherein the second thermal management feature is configured as a cooling hole defined by the wall and extending from an inlet on the cold side of the wall to an outlet on the hot side of the wall, wherein the second surface contouring on the cold side of the wall comprises additional material added to a local region surrounding the inlet of the cooling hole, the additional material surrounding the inlet of the cooling hole and extending less than continuously in a circumferential direction of the gas turbine engine.

13. The component of claim 12, wherein the surface contouring is configured to structurally accommodate a thermal management feature of the wall.

14. The component of claim 12, wherein the wall maintains a substantially constant thickness along a radial direction despite the inclusion of the local contour on the hot side and the local contour on the cold side.

* * * * *